(12) United States Patent
Thompson et al.

(10) Patent No.: US 9,745,495 B2
(45) Date of Patent: Aug. 29, 2017

(54) WATERBORNE COATING COMPOSITION

(71) Applicant: The Sherwin-Williams Company, Cleveland, OH (US)

(72) Inventors: Jovan L. Thompson, Bedford, OH (US); Zhangqing Yu, Twinsburg, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 15/170,662

(22) Filed: Jun. 1, 2016

(65) Prior Publication Data

US 2016/0347978 A1    Dec. 1, 2016

Related U.S. Application Data

(60) Provisional application No. 62/169,139, filed on Jun. 1, 2015.

(51) Int. Cl.

| | |
|---|---|
| *C09J 175/04* | (2006.01) |
| *C08G 18/66* | (2006.01) |
| *C08G 18/75* | (2006.01) |
| *C09D 175/06* | (2006.01) |
| *C08G 18/42* | (2006.01) |
| *C08G 18/44* | (2006.01) |

(52) U.S. Cl.
CPC ............ *C09J 175/04* (2013.01); *C08G 18/42* (2013.01); *C08G 18/44* (2013.01); *C08G 18/6644* (2013.01); *C08G 18/758* (2013.01); *C09D 175/06* (2013.01)

(58) Field of Classification Search
CPC ........ C09J 175/04; C08G 18/42; C08G 18/44; C08G 18/6644; C08G 18/758; C09D 175/06
See application file for complete search history.

(56) References Cited

U.S. PATENT DOCUMENTS

| | | | |
|---|---|---|---|
| 8,637,609 B1* | 1/2014 | Perumal | C09D 143/04 525/209 |
| 9,000,069 B1* | 4/2015 | Mackulin | C09D 125/14 523/201 |
| 2011/0245399 A1* | 10/2011 | Pajerski | C08F 283/008 524/457 |
| 2014/0303281 A1* | 10/2014 | Mackulin | C08F 220/18 523/205 |

FOREIGN PATENT DOCUMENTS

| | | | |
|---|---|---|---|
| CN | 102757533 | * | 10/2012 |
| CN | 103694880 | * | 4/2014 |
| CN | 104592882 | * | 5/2015 |
| JP | 3552387 | * | 8/2004 |

* cited by examiner

*Primary Examiner* — Robert Jones, Jr.
(74) *Attorney, Agent, or Firm* — Benesch, Friedlander, Coplan & Aronoff LLP

(57) ABSTRACT

In one embodiment, a single component waterborne coating composition includes water; a branched polyester polyurethane dispersion; a polycarbonate polyurethane dispersion blend including a branched polycarbonate PUD and an unbranched, hydroxyl functional, polycarbonate polyurethane dispersion; and a fluorinated acrylic latex resin. In another embodiment, the fluorinated acrylic latex resin may be replaced with a hybrid resin selected from the group consisting of a fluorinated acrylic and polyester polyurethane dispersion hybrid resin and a fluorinated acrylic and polycarbonate polyurethane dispersion hybrid resin.

20 Claims, No Drawings

WATERBORNE COATING COMPOSITION

RELATED APPLICATIONS

This application claims priority to U.S. Prov. Appl. No. 62/169,139, filed on Jun. 1, 2015, entitled "Waterborne Coating Composition."

FIELD OF THE INVENTION

This invention relates to a one component waterborne coating composition suitable for application to a variety of substrates, including metal, wood, and plastic, and particularly well suited for application to substrates on the interior of vehicles, such as automobiles, boats, and airplanes. Specifically, the waterborne coating composition may include a resin blend including a branched polyester polyurethane dispersion, a blend of polycarbonate polyurethane dispersions, and a fluorinated acrylic latex material.

BACKGROUND

Typically, coatings for the interior of automobiles, such as airplane cabins, have included a two-component solvent borne polyurethane system with an isocyanate hardener. These systems can often include volatile organic compounds (VOCs), which are now more tightly regulated by various industries and environmental organizations. It would be beneficial to create a one component waterborne system that would alleviate many of the environmental concerns associated with solvent borne systems, while still satisfying the industry standards, such as adhesion and scratch resistance for commercial aviation interiors.

SUMMARY

In one embodiment, a single component waterborne coating composition includes water; from about 5 percent by weight to about 70 percent by weight of a branched polyester polyurethane dispersion; a polycarbonate polyurethane dispersion blend including from about 1 percent by weight to about 15 percent by weight of a branched polycarbonate PUD; and from about 1 percent by weight to about 35 percent by weight of a fluorinated acrylic latex resin. The polycarbonate polyurethane dispersion blend may also include from about 1 percent by weight to about 25 percent by weight of an unbranched, hydroxyl functional, polycarbonate polyurethane dispersion.

In another embodiment, a single component waterborne coating composition includes water; a branched polyester polyurethane dispersion; a polycarbonate polyurethane dispersion blend, comprising a branched polycarbonate PUD; and a hybrid resin selected from the group consisting of a fluorinated acrylic and polyester polyurethane dispersion hybrid resin and a fluorinated acrylic and polycarbonate polyurethane dispersion hybrid resin. The polycarbonate polyurethane dispersion blend may also include an unbranched, hydroxyl functional, polycarbonate polyurethane dispersion.

DETAILED DESCRIPTION

In one embodiment, a one component waterborne coating composition may include a first resin composition and a second resin composition. In this embodiment, the first resin blend may include i) water, ii) a branched polyester polyurethane dispersion (PUD), and iii) a polycarbonate PUD blend of at least one branched polycarbonate PUD and/or, at least one unbranched, hydroxyl functional, polycarbonate PUD. The second resin blend may include a fluorinated acrylic latex. The waterborne coating compositions have demonstrated excellent adhesion and stain resistance.

Polyurethane Dispersions (PUDs)

The general preparation of PUDs comprises the reaction product of one or more polyisocyanates with one or more polyols. Polyols selected for use in the preparation of PUDs may include, inter alia, polycarbonate polyols, polyester polyols, polyether polyols, or combinations thereof.

For purposes of this disclosure, useful waterborne coating compositions include a resin blend that includes at least two and, in another embodiment, three PUDs—a polyester PUD and one (optionally two) polycarbonate PUDs, in combination with a fluorinated latex resin. The waterborne coating compositions including these resins provide coatings that demonstrate excellent adhesion to a wide variety of substrates and excellent resistance to a variety of stains, including, mustard, coffee, and biological oils and sweat.

Polyester PUD

In one embodiment, the first resin blend of the waterborne coating composition may include a polyester PUD. The polyester PUD may include the reaction product of a polyester polyol and one or a combination of the polyisocyanates (as will be described below with reference to both the polyester PUDs and the polycarbonate PUDs).

In one embodiment, suitable polyester polyols may be formed through condensation of one or more polyhydric alcohols with one or more polycarboxylic acids. Suitable polyhydric alcohols include, but are not limited to, glycerol, pentaerythritol, trimethylolpropane, 1,4,6-octanetriol, butanediol, pentanediol, hexanediol, dodecanediol, octanediol, chloropentanediol, glycerol monoalkyl ether, glycerol monoethyl ether, diethylene glycol, 2-ethylhexanediol-1,4, cyclohexanediol-1,4,1,2,6-hexanetriol, 1,3,5-hexanetriol, 1,3-bis-(2-hydroxyethoxy)propane, neopentyl glycol, 2-methyl propanediol, trimethylol propane monoallylether, 2,2,4-trimethyl-1,3-pentanediol, 1,4-butanediol, cyclohexanedimethanol, 2,2-dimethyl-3-hydroxypropyl-2,2-dimethyl-3-hydroxypropionate, and the like.

In particularly useful embodiments, the polyester PUD is not linear, but is branched. In this respect, the polyester PUD may have a degree of branching of between about 1.0% to about 7.0%, and in another embodiment about 2.5% to about 3.5%. The percent branching may be greater than about 1.0% or 1.25% or 1.5% or 1.75% or 2.0%, or 2.25% or 2.5% or 2.75% or 3.0% or 3.25% up to about 3.5%. In another embodiment, the percent branching may be less than about 7.0% or 6.75% or 6.5% or 6.25% or 6.0% or 5.75% or 5.5% or 5.25% or 5.0% or 4.75% or 4.5% or 4.25% or 4.0% or 3.75% or 3.5% or 3.25% or 3.0% or 2.75% down to about 2.5%.

Branching may be achieved by selective incorporation and use of one or more branching agents, such as trimethylolethane (TME), during the reaction process of the polyester polyol and the isocyanate. In addition to being branched, particularly useful polyester PUDs may be hydroxyl functional and may be substantially free of aromatic diol constituents.

Polycarbonate PUD

In one embodiment, the first resin blend of the waterborne coating composition may also include a polycarbonate PUD blend. Polycarbonate PUDs suitable for use in the waterborne coating composition may be formed from the reaction product of one or more polycarbonate polyols and one or more polyisocyanates (as discussed below).

Polycarbonate polyols may be formed as the reaction product of a polyol, such as 1,3-propanediol, 1,4-butanediol, 1,6-hexanediol, diethylene glycol, or tetraethylene glycol, with diaryl carbonates such as diphenyl carbonate or phosgene.

The first resin blend may, in one embodiment, include two or more polycarbonate PUDs. The first polycarbonate PUD may be a linear (unbranched) hydroxyl functional polycarbonate PUD. This linear polycarbonate PUD may have a hydroxyl number of between about 1 and about 25, and most usefully less than about 15 (mg KOH/g).

In contrast to the first polycarbonate PUD, the second polycarbonate PUD, which is preferably included in one embodiment and optionally included in another embodiment, will be a branched polymer having a percentage branching of between about 1.0 to about 2.0%, preferably about 1.5%. The branched polycarbonate PUD may be non-hydroxyl functional.

In one embodiment, one or both of the polycarbonate PUDs may be substantially or completely free of aromatic diol constituents.

Polyisocyanates

Concerning the preparation of both the polyester and polycarbonate PUDs, the polyisocyanate may be selected from one or more or a combination of the following: ethylene diisocyanate, cyclohexyl isocyanate, phenyl isocyanate, toluene isocyanate, 1,2,4-benzene triisocyanate, pure or polymeric diphenylmethane diisocyanates such as 4,4'-diphenylmethane diisocyanate, 1,3-phenylene diisocyanate, 1,4-phenylene diisocyanate, tolylene diisocyanate, 1,4-tetramethylene diisocyanate, 1,6 hexamethylene diisocyanate, 2,4,4-trimethyl 1,6-hexamethylene diisocyanate, 1,4-cyclohexyl diisocyanate, isophorone diisocyanate (IPDI), 4,4'-methylene-bis(cyclohexylisocyanate), 1,12-dodecane diisocyanate, cyclobutane-1,3-diisocyanate, cyclohexane-1, 3- and/or 1,4-diisocyanate, 1-isocyanto-2-isocyantomethyl cyclopentane, 2,4- and/or 2,6-hexahydrotoluylene diisocyanate, 2,4- and/or 4,4'-dicyclohexylmethane diisocyanate, $\alpha,\alpha,\alpha',\alpha$-tetramethyl-1,3- and/or -1,4-xylylene diisocyanate, 1-isocyanto-1-methyl-4(3)-isocyantomethyl-cyclohexane, 1/3- and 1,4-phenylene diisocyanate, naphthalene-1,5-diisocyanate, triphenyl methane-4,4',4"-triisocyanate, polyphenyl polymethylene polyisocyanates, as well as other similar isocyanates known or discovered to be capable for use in coatings applications, and mixtures of the foregoing.

A catalyst may be employed to accelerate the reaction to form the PUDs. Examples of suitable catalysts include dibutyltin dilaurate, stannous octoate and the like. The reaction may occur in minutes or may take several hours to days to complete depending on the reactivity of the reactants, temperature, mixing, presence of the catalyst, as well as other factors.

A solvent may also be employed for the PUD formation reaction. In the alternative, a solvent may be added after the PUD is formed. Suitable solvents may include but are not limited to ketones, tertiary alcohols, ethers, esters, hydrocarbons, and chlorocarbons. More specific examples of solvents include acetone, N-methyl pyrrolidone, acetonitrile, and DMM solvent. Solvents assist with controlling the viscosity of the polymer. In some embodiments, the solvent may be used in an amount up to about 60%, for example about 20% to about 60% by weight, based on the total weight of the solvent and PUD polymer.

The amount of isocyanate and active-hydrogen containing compound represented as the polyester and polycarbonate polyols should be such that the equivalent ratio of isocyanate to active-hydrogen containing compound may be at least about 1.2:1. In one embodiment, the molar ratio of isocyanate to active-hydrogen may be in the range of about 7 to 1.2:1; in another embodiment about 6 to about 1.2:1, in still another embodiment about 3 to 1.2:1 in a further embodiment, about 1.5 to 1.9:1, such as about 1.7:1.0.

Fluorinated Acrylic Latex Resin

The second resin blend of the waterborne coating composition may include a fluorinated acrylic latex. The fluorinated acrylic latex may include a stratifying latex resin having hybrid metal oxide latex particles wherein the hybrid particles are the polymerization reaction product of at least one or more copolymerizable monoethylenically unsaturated monomers. The monoethylenically unsaturated monomers may include at least one low surface energy driver monomer selected from the group including (i) a fluorine containing monomer and (ii) a silane-containing monomer. The polymerization reaction may generally be carried out in the presence of a metal oxide nanoparticle embedded within the hybrid particles. Such useful lattices are taught inter alia US20140303281, which is incorporated herein by reference for all that it teaches concerning stratifying latex resins.

The acrylic latex resin may, in some useful embodiments, have a transition temperature (Tg) (° C.) of between about −30 and 30, and preferably about −20 to about 20, and in some embodiments, between about 0 and about 20.

Fluorinated Acrylic PUD Hybrid Resin

In accordance with another embodiment of the invention, it has been surprisingly discovered that a fluorinated acrylic polyester PUD hybrid resin may be used to replace some or all of the fluorinated acrylic latex and at least a portion of the polyester PUD in the formulations described above, yielding noticeable improvements in the properties and performance of the coatings while allowing for one component coatings.

The fluorinated acrylic polyester PUD hybrid resin may be a core shell hybrid resin comprising a fluorinated acrylic core and polyester PUD shell. The hybrid resin may be silicon free or substantially silicon free (less than 0.1 weight %). The fluorinated acrylic core may comprise one of the fluorinated acrylic latex resins disclosed above. The polyester PUD resin shell may comprise one of the polyester PUD resins disclosed above.

While it is contemplated that a fluorinated acrylic polyester PUD hybrid resin including a fluorinated acrylic and polyester PUD may be used, in some embodiments, it may be useful to include a hybrid resin comprising a fluorinated acrylic resin and one of the polycarbonate PUD resins disclosed above.

Fluorinated acrylic polyester PUD hybrid resins comprising an acrylic to polyester PUD ratio (based on % solids) of about 20:80 to about 80:20 may be useful. Preferred ratios may be about 40:60 to about 60:40 and still further preferred, about 30:70 to about 50:50 and still further, about 40:60 to about 50:50.

Additives

In addition to the resins set forth above, the waterborne coating compositions may also include additives, including but not limited to pigments, thickeners, dispersants, surfactants, anti-settling agents, biocides/preservatives, coalescing agents, plasticizers, stabilizers, viscosifiers, leveling aids, defoamers, anti-skinning agents, extenders, crosslinkers, corrosion inhibitors, matting agents, etc. Exemplary pigments include titanium dioxide, calcium carbonate, diatomaceous earth, mica, hydrated aluminum oxide, barium sulfate, calcium silicate, clay, silica, talc, zinc oxide, aluminum silicate, nepheline syenite, and mixtures thereof. For colored waterborne coating compositions, desired colorants are added to the waterborne coating compositions. The colored species may be selected from any known colorants, such as metallic oxides or synthetic organic pigments. In many useful embodiments, the waterborne coating compositions may be a clearcoat, free of colored pigments.

In one embodiment, the waterborne coating compositions may be prepared by blending the first resin composition—comprising the PUDs dispersed in one or more solvents, water and optionally, additional amounts of one or more compatible organic solvents and conventional additives—with the second resin composition, comprising the fluorinated acrylic latex and water. The two resin compositions may be packaged separately until just prior to use. The waterborne coating composition so combined may include, based on total resin solids:

From about 5 to about 70° % polyester PUD:

From about 1 to about 25% linear (unbranched) hydroxyl functional polycarbonate PUD;

From about 1 to about 15% branched polycarbonate PUD; and

From about 1 to about 35% fluorinated acrylic latex.

In another embodiment, the four resins may be blended together in a single composition, with water, optional solvents and additives prior to application.

A second embodiment, the waterborne coating composition may be prepared as described above, except that the second resin composition will include a fluorinated acrylic latex polyester PUD hybrid or fluorinated acrylic latex polycarbonate PUD hybrid. The waterborne coating composition so combined may include, based on total resin solids:

From about 1 to about 25% polyester PUD;

From about 1 to about 25% linear (unbranched) hydroxyl functional polycarbonate PUD;

From about 1 to about 15% branched polycarbonate PUD; and

From about 1 to about 75% fluorinated acrylic latex polyester PUD hybrid or fluorinated acrylic latex polycarbonate PUD hybrid.

The waterborne coating compositions thus formed may be blended and applied to a substrate by any conventional means, including, spraying, dipping, brushing, rolling or the like. The coatings of the present invention may be applied directly to a substrate or over a primer coat or a decorative coat.

EXAMPLES

Preparation of Polyurethane Dispersions

Examples of general ingredients for the preparation of the polyurethane dispersions (PUD) are shown below:

| Polyester PUD - Branched | |
|---|---|
| Raw Material | Weight % monomer solids |
| Hexanediol phthalate | 44.8 |
| Hexanediol | 0.4 |
| Trimethylolethane | 1.4 |
| Dicyclohexylmethane-4'-diisocyanate | 53.4 |

| Polycarbonate PUD - Linear | |
|---|---|
| Raw material | Weight % monomer solids |
| Polycarbonate diol | 56.3 |
| Methylene-dicyclohexyldiioscyanate | 43.7 |

| Polycarbonate PUD - Branched | |
|---|---|
| Raw Material | Weight % monomer solids |
| Polycarbonate diol | 44.6 |
| Hexanediol | 1.6 |
| Trimethylolethane | 0.7 |
| Dicyclohexylmethane-4'-diisocyanate | 53.1 |

Coating Compositions

One example includes a waterborne coating composition including two PUD resins. In this example, about 25.3 percent by weight of the total composition (wt %) of polyester PUD is combined with about 11.2 wt % of branched, non-hydroxyl functional, polycarbonate PUD to form a first resin composition. The first resin composition is blended.

While the first resin composition is mixed, the following are added: about 0.2 wt % TEGO FOAMEX 825 defoaming agent, available from Evonik Resource Efficiency GmbH, about 0.3 wt % anhydrous dimethylethanolamine (DMEA), about 9.8 wt % deionized water, about 2.7 wt % of solvent 2-ethoxyethyoxyethanol, about 30.4 wt % SW AWX white toner, commercially available from The Sherwin Williams Company, about 6.1 wt % AQUATIX 8421 rheology modifier, commercially available from Byk Additives and instruments, and about 14.0 wt % of a second resin composition including a fluorinated acrylic emulsion.

A second example includes a waterborne coating composition including three PUD resins. In this example, about 36.0 wt % of polyester PUD is combined with about 11.5 wt % of branched, non-hydroxyl, polycarbonate PUD and 4.4 wt % of linear, hydroxyl functional, polycarbonate PUD to form a first resin composition. The first resin composition is blended.

While the first resin composition is mixed, the following are added: about 0.1 wt % TEGO FOAMEX 825 defoaming agent, available from Evonik Resource Efficiency GmbH, about 0.4 wt % DMEA, about 12.2 wt % deionized water, about 4.0 wt % of solvent dipropylene glycol methyl ether (DPM), about 7.6 wt % SW AWX black toner, commercially available from The Sherwin Williams Company, about 7.2 wt % AQUATIX 8421 rheology modifier, commercially available from Byk Additives and instruments, and about 16.7 wt % of a second resin composition including a fluorinated acrylic emulsion.

Both example waterborne coating compositions were tested to ensure that each met the industry requirements for aircraft interior coatings. Specifically, Table I below shows the tests that were performed, the methodology used, and the results of the individual tests.

TABLE 1

| Test Performed | Methodology | Example 1 | Example 2 |
| --- | --- | --- | --- |
| Dry Adhesion, Tape Test | BSS 7225 (8 pass) (Boeing Specification Support Standard) | Pass | Pass |
| Adhesion Post 24 Hr Water Soak | BSS 7225 (8 pass) | Pass | Pass |
| Adhesion Post 24 Hr Humidity (95 F./80% RH) | BSS 7225 (8 pass) | Pass | Pass |
| Scratch Resistance | Shall not scratch using a 5 kg (nominal) load and pull (instead of push) loop stylus across test area | Pass | Pass |
| Soil Stain, tomato juice | Spot testing, no visible residue | Pass | Pass |
| Soil Stain, chicken gravy | Spot testing, no visible residue | Pass | Pass |
| Soil Stain, beef soup broth | Spot testing, no visible residue | Pass | Pass |
| Soil Stain, chicken soup broth | Spot testing, no visible residue | Pass | Pass |
| Soil Stain, butter | Spot testing, no visible residue | Pass | Pass |
| Soil Stain, orange juice | Spot testing, no visible residue | Pass | Pass |
| Soil Stain, hair oil | Spot testing, no visible residue | Pass | Pass |
| Soil Stain, Lipstick | Spot testing, no visible residue | Pass | Pass |
| Soil Stain, mustard | Spot testing, no visible residue | Pass | Pass |
| Soil Stain, coffee w/cream | Spot testing, no visible residue | Pass | Pass |

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available or prudent in manufacturing. To the extent that the term "operably connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. A single component waterborne coating composition comprising:
   water;
   from about 5 percent by weight to about 70 percent by weight of a branched polyester polyurethane dispersion;
   a polycarbonate polyurethane dispersion blend, comprising from about 1 percent by weight to about 15 percent by weight of a branched polycarbonate polyurethane dispersion; and
   from about 1 percent by weight to about 35 percent by weight of a fluorinated acrylic latex resin.

2. The single component waterborne coating composition of claim 1, wherein the polycarbonate polyurethane dispersion blend further comprises from about 1 percent by weight to about 25 percent by weight of an unbranched, hydroxyl functional, polycarbonate polyurethane dispersion.

3. The single component waterborne coating composition of claim 1, wherein the branched polyester polyurethane dispersion comprises the reaction product of a polyester polyol and at least one polyisocyanates; wherein the polyester polyol is formed through the condensation of at least one polyhydric alcohol with at least one polycarboxylic acid.

4. The single component waterborne coating composition of claim 3, wherein the at least one polyhydric alcohol is selected from the group consisting of glycerol, pentaerythritol, trimethylolpropane, 1,4,6-octanetriol, butanediol, pentanediol, hexanediol, dodecanediol, octanediol, chloropentanediol, glycerol monoalkyl ether, glycerol monoethyl ether, diethylene glycol, 2-ethylhexanediol-1,4, cyclohexanediol-1,4,1,2,6-hexanetriol, 1,3,5-hexanetriol, 1,3-bis-(2-hydroxyethoxy)propane, neopentyl glycol, 2-methyl propanediol, trimethylol propane monoallylether, 2,2,4-trimethyl-1,3-pentanediol, 1,4-butanediol, cyclohexanedimethanol, 2,2-dimethyl-3-hydroxypropyl-2, 2-dimethyl-3-hydroxypropionate, and combinations thereof.

5. The single component waterborne coating composition of claim 1, wherein the branched polyester polyurethane dispersion has a degree of branching of between about 1.0% to about 7.0%.

6. The single component waterborne coating composition of claim 5, wherein the branched polyester polyurethane dispersion has a degree of branching of between about 2.5% to about 3.5%.

7. The single component waterborne coating composition of claim 1, wherein the branched polyester polyurethane dispersion is a branched, hydroxyl functional, polyester polyurethane dispersion.

8. The single component waterborne coating composition of claim 1, wherein the branched polyester polyurethane dispersion is substantially free of aromatic diol constituents.

9. The single component waterborne coating composition of claim 2, wherein the unbranched, hydroxyl functional, polycarbonate polyurethane dispersion has a hydroxyl number of between about 1 and about 25.

10. The single component waterborne coating composition of claim 1, wherein the branched polycarbonate polyurethane dispersion has a percentage branching of between about 1.0 to about 2.0%.

11. A single component waterborne coating composition comprising:
   water;
   a branched polyester polyurethane dispersion,
   a polycarbonate polyurethane dispersion blend, comprising a branched polycarbonate PUD; and
   a hybrid resin selected from the group consisting of a fluorinated acrylic and polyester polyurethane dispersion hybrid resin and a fluorinated acrylic and polycarbonate polyurethane dispersion hybrid resin.

12. The single component waterborne coating composition of claim 11, wherein the polycarbonate polyurethane dispersion blend further comprises an unbranched, hydroxyl functional, polycarbonate polyurethane dispersion.

13. The single component waterborne coating composition of claim 11, wherein the branched polyester polyurethane dispersion comprises the reaction product of a polyester polyol and at least one polyisocyanates; wherein the polyester polyol is formed through the condensation of at least one polyhydric alcohol with at least one polycarboxylic acid.

14. The single component waterborne coating composition of claim 13, wherein the at least one polyhydric alcohol is selected from the group consisting of glycerol, pentaerythritol, trimethylolpropane, 1,4,6-octanetriol, butanediol, pentanediol, hexanediol, dodecanediol, octanediol, chloropentanediol, glycerol monoalkyl ether, glycerol monoethyl ether, diethylene glycol, 2-ethylhexanediol-1,4, cyclohexanediol-1,4,1,2,6-hexanetriol, 1,3,5-hexanetriol, 1,3-bis-(2-hydroxyethoxy)propane, neopentyl glycol, 2-methyl propanediol, trimethylol propane monoallylether, 2,2,4-trimethyl-1,3-pentanediol, 1,4-butanediol, cyclohexanedimethanol, 2,2-dimethyl-3-hydroxypropyl-2,2-dimethyl-3-hydroxypropionate, and combinations thereof.

15. The single component waterborne coating composition of claim 11, wherein the branched polyester polyurethane dispersion has a degree of branching of between about 1.0% to about 7.0%.

16. The single component waterborne coating composition of claim 15, wherein the branched polyester polyurethane dispersion has a degree of branching of between about 2.5% to about 3.5%.

17. The single component waterborne coating composition of claim 11, wherein the branched polyester polyurethane dispersion is a branched, hydroxyl functional, polyester polyurethane dispersion.

18. The single component waterborne coating composition of claim 12, wherein the unbranched, hydroxyl functional, polycarbonate polyurethane dispersion has a hydroxyl number of between about 1 and about 25.

19. The single component waterborne coating composition of claim 11, wherein the branched polycarbonate polyurethane dispersion has a percentage branching of between about 1.0 to about 2.0%.

20. A waterborne coating composition comprising:
   from about 1 to about 25% polyester polyurethane dispersion;
   from about 1 to about 25% linear hydroxyl functional polycarbonate polyurethane dispersion;
   from about 1 to about 15% branched polycarbonate polyurethane dispersion; and
   from about 1 to about 75% fluorinated acrylic latex polyester polyurethane dispersion hybrid or fluorinated acrylic latex polycarbonate polyurethane dispersion hybrid.

* * * * *